April 9, 1957 S. I. GUSSACK 2,788,253
PIVOTING SLIDE
Filed July 22, 1954 2 Sheets-Sheet 2
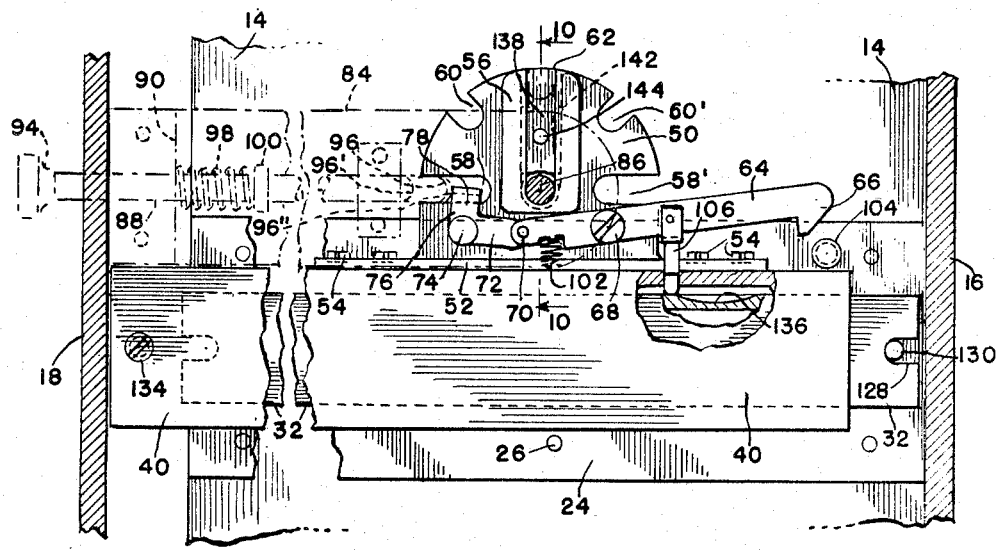
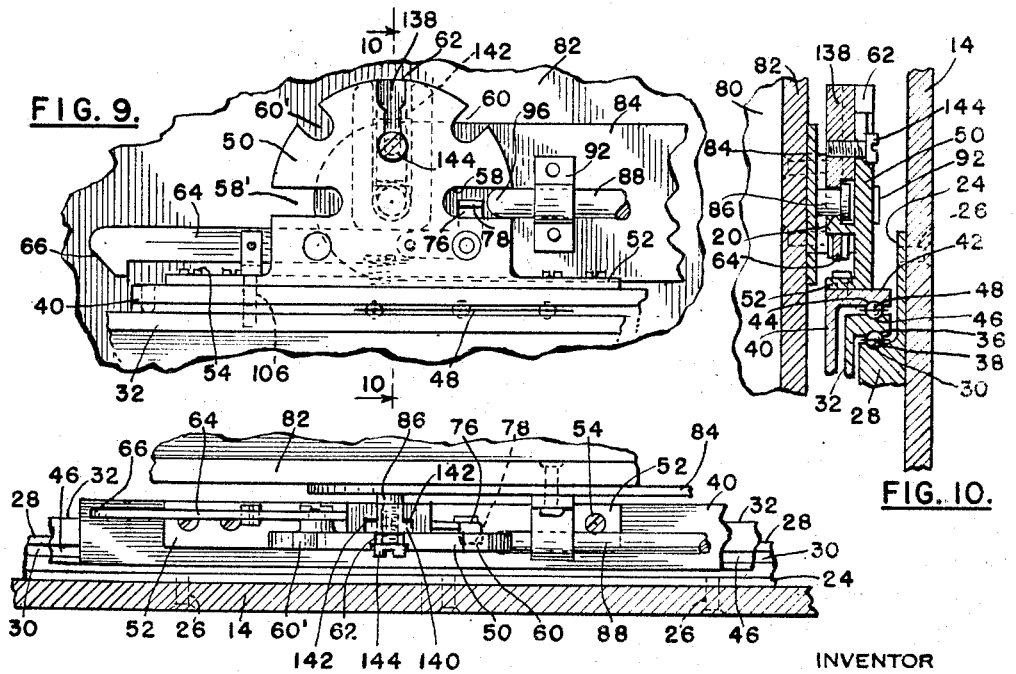
INVENTOR
SEYMOUR I. GUSSACK,
BY
Irving Seidman
ATTORNEY United States Patent Office 2,788,253
Patented Apr. 9, 1957

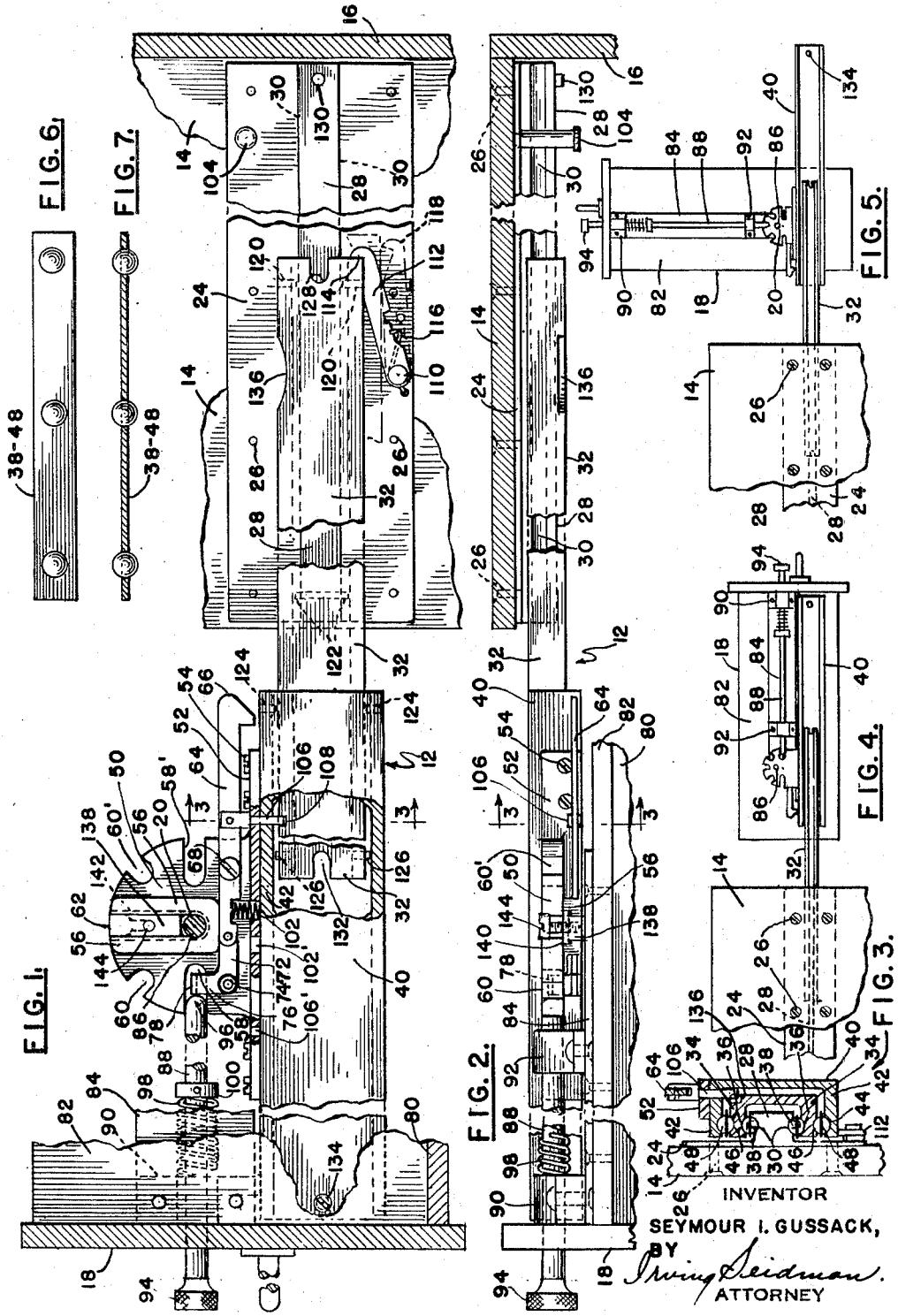

2,788,253

PIVOTING SLIDE

Seymour I. Gussack, Flushing, N. Y., assignor to Grant Pulley & Hardware Corporation, Flushing, N. Y., a corporation Application July 22, 1954, Serial No. 445,134

6 Claims. (Cl. 312—323)

This invention relates to a locking and releasing means for slide brackets and has particular reference to slidable tray supporting brackets especially usable with all types of electronic equipment and is in the nature of an improvement upon a patent issued to applicant on October 13, 1953, bearing No. 2,655,422.

One object of this invention is to provide a locking and releasing means for a slide bracket which may be secured to the side walls of a cabinet or stand and support upon its sliding elements a chassis carrying electronic instruments or a tray or drawer in which a chassis for an electronic instrument may be carried or supported and permitting the said chassis tray or drawer to be moved outwardly from the cabinet or stand.

A second object is to provide a locking and releasing means for a supporting slide bracket as above described upon which the said chassis or tray may be pivotally mounted and swung around an angle to expose the bottom of same to permit easy access to the parts of the instrument therein.

A third object of this invention is to provide a locking and releasing means for a slide bracket as described, in which the moving parts of the slide bracket may be horizontally moved outwardly from the cabinet and be automatically locked in fixed outermost position and manually released to retract same from their outermost position.

A fourth object of this invention is the provision, in the invention described, of automatically actuated locking means to hold the parts in locked fixed position when the slide elements are retracted or moved to closed position.

A fifth object of this invention is to include in a slide bracket as described, means for manually and automatically actuating the locking means when sliding the moving element of the slide bracket in either forward or retracted direction.

A sixth object of this invention is the provision therein, of means for tilting a chassis or tray pivotally mounted upon the slide bracket and means upon the slide bracket coacting with a locking and releasing means upon the said chassis or tray to fix and lock same in a selected angular adjustment with the horizontal axis of the slide bracket and having manually operated means for releasing the chassis or tray from its tilted position.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawing, in which:

Fig. 1 is an elevational side view of an assembled, slide bracket with a locking and releasing means, showing the relative position of the parts when fully extended and has intermediate parts broken away to better illustrate the operating parts.

Fig. 2 is a top or plan view of same.

Fig. 3 is a transverse sectional elevation taken in a plane along the lines 3—3 of Figs. 1 and 2, looking in the direction indicated by the arrows.

Fig. 4 is a side elevational view of a drawer upon its slide bracket supports when fully withdrawn from a cabinet, a fragment of which is shown.

Fig. 5 is a similar view but shows the drawer in a tilted position.

Fig. 6 is a plan view of a ball-bearing element used in this invention.

Fig. 7 is a longitudinal sectional view of Fig. 6 and is taken approximately through its longitudinal center.

Fig. 8 is a view somewhat similar to Fig. 1, but shows the slides in retracted position, longitudinal portions being broken away and parts in section.

Fig. 9 is an elevational view showing the opposite side of a part of Fig. 8.

Fig. 10 is a transverse sectional view taken in a plane indicated by lines 10—10 of Figs. 8 and 9 and looking in the direction indicated by arrows, and Fig. 11 is a top or plan view of Fig. 9.

Referring in detail to the parts in which similar reference numerals refer to similar parts throughout, 12, in general, indicates a slide bracket, a part of which is secured to the inside of the side walls 14 of a cabinet. A fragment of the rear wall 16 of the cabinet is shown in Figs. 1, 2 and 3. A tray or drawer 18 is pivotally mounted, at 20 upon the slide brackets 12, while a single slide bracket is shown in the illustrations and herewith described, it is to be understood that a slide bracket is also partly attached to the far side wall of the side walls 14, and that the tray 18 is pivotally mounted upon and between both slide brackets.

Each slide bracket consists essentially, of three parts, namely, a stationary outer member or plate 24, each of which is secured to a side wall 14 of the cabinet by means of screws 26. The plate 24 or outer stationary member is formed with a centrally aligned rib or track portion 28 which has, along its upper and lower surfaces, raceways 30. An intermediate channel member 32 engages around the said rib or track portion 28 and has upper and lower flanges 34 upon which are race-ways 36 opposed to race-ways 30 upon the track member 28. Disposed between said race-ways 30 and 36 are ball bearing units 38. An inner channel member 40 engages around the intermediate channel member 32 and has upper and lower flanges 42 upon which there are race-ways 44 which are opposed to race-ways 46 upon the intermediate channel member 32 and in which ball bearing units 48 run.

An upstanding semi-circular plate member 50 having a flanged base 52 is secured, by means of screws 54, to the upper edge of the inner channel member 40. A bearing pocket 20 is formed upon the upstanding semi-circular plate 50 by a laterally projecting U-shaped ridge 56 which forms a passage for a pivoting pin secured upon a tray or drawer and will be hereinafter fully described. Around the periphery of the semi-circular plate 50 there is formed a series of spaced notches. Two lower notches 58 and 58' extend deeply into the semi-circular plate and are arranged horizontally and are diametrically aligned, the next two upper notches 60 and 60' are shallow and arranged at an angle of 45° to the diametrically arranged deep notches 58 and 58' and the uppermost single notch 62 is arranged at an angle of 90° to the lower notches 58.

A locking arm 64 having a hook end 66 is pivotally connected, at 68, to the semi-circular plate 50 and has loose pivotal connection, at 70, with one arm 72 of an L-lever which is pivotally connected at 74 to the semi-circular plate 50 and has an upwardly extending arm 76, the upper end 78 of which, is angularly bent and extends into the notch 58 for the purpose which will be shortly explained.

A tray or drawer, the front panel 18, a fragment of the bottom 80 and side wall 82 which is shown in Fig. 1, is pivotally mounted, as already stated, in a bearing pocket 20 formed upon the semi-circular plate 50. Suitably attached to the side wall 82 of the said tray or drawer there is an elongated plate 84 (Figs. 4, 5 and 9) near the inner end of which there is formed a pin 86 which is adapted to engage in the bearing pocket 20 and provides the means by which the tray is mounted upon the inner member 40 of the sliding bracket. Upon the said elongated plate 84 there is slidably mounted, a locking and releasing rod 88 which is slidable in bearing blocks 90 and 92 in turn secured to the elongated plate 84. The front end of said rod 88 extends through and slightly beyond the face of the front panel 18 of the tray or drawer and terminates in a finger hold or handle 94 by means of which the rod 88 may be either pushed in or pulled out for the purpose to be explained. The opposite end 96 of the releasing and locking rod 88 normally engages part way into the notch 58 as best indicated in Figs. 1 and 9 and by dotted line 96 in Fig. 8. A spring 98 encircles the rod 88 and is disposed between the bearing block 90 and a collar 100 fixed thereon. The said spring 98 is fixed in the position shown and acts to maintain the rod 88 normally in position part way into the notch 58 as shown in Figs. 1 and 9. When in said position the tray or drawer is held in locked horizontal position. When it is desired to tilt the tray the rod is pulled out, against the urge of the spring 98, until its end 96 is free of the notch 58 as indicated by the dot-dash line 96' as shown in Fig. 8. The tray may then be tilted to a 45° or 90° angle and the rod 88 released and allowed to enter either notch 60 or 62 and lock the tray in either a 45° or 90° angle respectively. The locking and releasing means above described are outlined by dot-dash lines, in Fig. 8 (inasmuch as they are located in a plane in front of the parts shown in full lines). When, however, the rod is given a further inward movement the end, shown by dot-dash line 96'', will contact the turned-in angular end 78 of the L-lever arm 76 and will move same inwardly and its arm 72 downwardly to raise the hood-end 60 of the locking arm 64 as indicated in Fig. 8 and for a purpose which will be hereinafter explained.

A spring 102 (Figs. 1 and 8), is disposed between the short end of the locking arm 64 and the top of the inner channel member 40 and is adapted to urge the locking arm 64 to its horizontal position as indicated in Fig. 4. The hook-end 66 of the locking arm 64 is adapted to engage over a lock-pin 104 upon the stationary outer member 24 when the slide bracket is fully retracted. A locking pin 106 is pivotally attached to the locking arm 64 and depending therefrom passes through orifices in the flanged base 52 of the semi-circular plate 50 to engage in a notch or pocket 108 in the top flange of the intermediate channel member 32 for the purpose of locking same to the inner channel member 40 (Figs. 1 and 3).

Pivotally attached to the stationary outer member 24 at 110 (Fig. 1), is a latch 112 formed with a hook-end 114 which is adapted to engage the lower free corner of the intermediate channel member 32 and is urged into position by a spring 116. The said latch 112 is designed to maintain the intermediate channel member 32, in position when same is extended to its outermost position and is released from its locking contact therewith when the inner channel member 40 is retracted as indicated by the dot-dash line 118.

The ball-bearing units are conventional and both units 38 and 48 are similar. The ball bearing unit 38 is adapted to run in race-ways 30 and 36 while ball bearing unit 48 is adapted to run in race-ways 44 and 46, shown in Figs. 3 and 9. The ball bearing units 38 and 48 also function as a means for limiting the outward movement of the sliding channel members; their length being gauged to bring to a stop the intermediate channel member when pins 120 upon the flanges of the intermediate channel member 32 and pins 122 contact both ends of the ball bearing unit 48. Each set of pins extend into race-ways 30 and 36. In a similar manner ball bearing units 48 contact the pins 124 and 126 to limit the outward movement of the inner channel member 40 with respect to the intermediate channel member 32. A slot 128 upon the inner end of the intermediate channel member 32 is adapted to engage a pin 130 upon the rib or track 28 when the intermediate channel member is fully retracted and a slot 132 upon the opposite or outer end of the intermediate channel member 32 engages a pin 134 which extends through the wall of the inner channel member 40 to receive the said slotted portion 132.

A slight depression 136 is formed upon the top surface of the intermediate channel member (Figs. 1 and 8), to allow the pin 106 to drop and permit the hook-end 66 of the locking arm 64 to engage the locking pin 104.

*Operation*

When the tray and its supporting slide members are fully retracted the locking hook 66 upon the locking arm 64 engages the locking pin 104 and holds all parts securely in closed position within the cabinet. When it is desired to pull the tray or drawer out of the cabinet, the releasing rod 88 is pushed inwardly which action raises the hook end 66 free of the locking pin 104 and allows the tray to be withdrawn. The depending pin 106 rising out of the depression 136 will ride along the top of the intermediate channel member 32 (Fig. 8), until it reaches the notch or pocket 108 in the top surface of the intermediate channel member 32 (Fig. 1). A continued outward movement of the tray or drawer will draw the intermediate channel member 32 outwardly. The latching member 112 against which the bottom edge of the intermediate member 32 has been sliding will engage the rear end of the said intermediate channel member 32, as clearly shown in Fig. 1, and lock same against any retractive movement, while the depending locking pin 106, in engagement with the notch 108 will hold the inner channel member 40 against retractive movement. The drawer or tray is now in a position for tilting which is accomplished by pulling out the locking and releasing rod 88 to release its inner end 96 from the notch 58 thereby permitting the tray to be tilted to a 45° or 90° angle and locked in the selected position by releasing the rod 88 and allowing its end 96 to enter notch 60 or 62, as the case may be.

To retract the tray the following procedure must be effected. Releasing the tray from its tilted position and locking it in its normal horizontal position, the rod 88 is then pushed inwardly to release the locking pin 106, and permit the inner channel member 40 to roll along the intermediate channel member 32, the locking pin 106 sliding along the top of the intermediate channel member 32 until it reaches the depression 136 allowing the locking arm 64 and its hook end 66 to drop to its horizontal position. At the same time as the latch 112 is released by its contact with the lower rear end of the inner channel member 40, the pin 134 moves into the slot 132 upon the intermediate channel member 32 and drives it further into the cabinet, the locking end 66 of the locking arm 64 contacting the locking pin 104, rides up over same to lock the channel members in fully retracted position. The slot 128 engages over the stop pin 130. The tray is thus locked in retracted position and may be withdrawn from the cabinet by pushing inwardly the rod 88 to release the locking hook 66 from the locking pin 104.

Referring back to the semi-circular notched plate 50 it will be noted that the said plate has two unused notches, namely 58' and 68'. These notches come into use upon the slide bracket which is attached to the opposite side wall of the cabinet. The notched plate 50 has been so designed as to be usable on either side wall and when so used the notches 58 and 60 are out of use and the locking arm pivotal connection 68 is transferred to the opposite end of the notched plate 50 or in other words, at the point where the pivotal connection 74 is shown. The L-lever element has its angularly turned-in upper end 78 directionally reversed and perforations or orifices for the spring 102 and locking pin 106 are provided as shown at 102' and 106'.

A block 138, formed with flanges 140, is slidable in grooves 142 formed upon the plate 50 and is held and locked thereon by means of a screw 144. The said block 138, when in place, functions as a locking means for preventing displacement of said pivotally mounted tray or drawer. To remove the tray the block must be removed.

A key operated lock may be provided to further secure the tray when retracted, but as such a lock is not part of this invention the same has not been shown in the drawings.

I claim:

1. A locking and releasing means for slide brackets, the combination with extensible slide brackets for side walls of a cabinet and for pivotally supporting a chassis thereon, comprising a stationary member having a supporting rib thereon for affixing to the side walls of said cabinet, an intermediate channel member slidable upon said rib upon said stationary member, an inner channel member slidable upon said intermediate channel member, an upright semi-circular notched plate upon the said inner channel member, said upright semi-circular plate having a bearing pocket adapted to receive a chassis, said chassis having side walls, said chassis having partial rotation about the said bearing pocket, a slidable rod upon the side walls of the said chassis and engageable with said notches on said semi-circular plate permitting said chassis to assume a tilted position, a locking arm pivotally attached to the said semi-circular plate, an L-lever pivotally connected to one end of the said locking arm and having one arm of the L-lever angularly bent to engage within one of the said notches in said semi-circular plate and adapted to partial rotation by contact with said slidable rod, said locking arm being formed with a hook end, a locking pin upon said stationary member adapted to engage with said hook end upon said locking arm and adapted to lock the intermediate and inner channel members in retracted position.

2. A locking and releasing means for slide brackets as set forth in claim 1, including a locking pin secured to and depending from said locking arm and adapted to engage through the the base of semi-circular notched plate and said intermediate channel member to a notch in said intermediate channel member for locking said intermediate channel member and said inner channel member together.

3. A locking and releasing means for slide brackets as set forth in claim 1, including a spring actuated latch pivotally attached to said stationary member and adapted to engage the inner end of said intermediate member to lock the same in its extended position.

4. A locking and releasing means for slide brackets as set forth in claim 1, including a spring disposed between the underside of said locking arm and the top of said inner channel member for urging said locking arm to its horizontal position.

5. A locking and releasing means for slide brackets as set forth in claim 1, including a pin upon the forward end of said inner channel member engageable in a slot upon the forward end of said intermediate channel member for completing the retractive movement of said intermediate channel member.

6. A locking and releasing means for slide brackets as set forth in claim 1, including a flanged block slidable in grooves upon said semi-circular plate and a screw engageable through said semi-circular plate and said flanged block for locking said chassis in a bearing pocket.

References Cited in the file of this patent
UNITED STATES PATENTS 2,630,364    Gleason _____ Mar. 3, 1953
2,655,422    Gussack _____ Oct. 13, 1953